United States Patent
Earl et al.

(10) Patent No.: US 11,619,140 B1
(45) Date of Patent: Apr. 4, 2023

(54) PRODUCING POWER WITH TURBOEXPANDER GENERATORS BASED ON SPECIFIED OUTPUT CONDITIONS

(71) Applicant: Sapphire Technologies, Inc., Cerritos, CA (US)

(72) Inventors: Jeffrey Earl, Hermosa Beach, CA (US); Freddie Sarhan, Cerritos, CA (US); Jeremy Liu, Norwalk, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 17/662,029

(22) Filed: May 4, 2022

Related U.S. Application Data

(63) Continuation-in-part of application No. 17/658,608, filed on Apr. 8, 2022.

(51) Int. Cl.
  *F01D 17/14* (2006.01)
  *F01D 17/16* (2006.01)
  (Continued)

(52) U.S. Cl.
  CPC ............ *F01D 17/145* (2013.01); *F01D 17/16* (2013.01); *H02K 7/09* (2013.01); *H02K 7/1823* (2013.01); *F05D 2220/76* (2013.01)

(58) Field of Classification Search
  CPC ......... F01D 17/145; F01D 17/16; H02K 7/09; H02K 7/1823; F05D 2220/76
  See application file for complete search history.

(56) References Cited

U.S. PATENT DOCUMENTS 5,924,847 A   7/1999  Scaringe et al.
6,073,447 A *  6/2000  Kawakami ............ F01D 17/146
                                                60/602
(Continued)

FOREIGN PATENT DOCUMENTS

CN      105401990 A       3/2016
EP       2096264 A2 *     9/2009  ........... F01D 17/145
(Continued)

OTHER PUBLICATIONS

Maghon et al., "50-Hz Heavy Duty Gas Turbines—Experience and Evolution," Siemens Power Generation (PG), upon information and belief, available no later than Jun. 8, 2021, retrieved on May 20, 2022, 10 pages.

*Primary Examiner* — Pedro J Cuevas
(74) *Attorney, Agent, or Firm* — Fish & Richardson P.C.

(57) ABSTRACT

A first turboexpander generator is configured to decrease a temperature or pressure of a process stream flowing through the first turboexpander generator by generating electrical power from the process stream. A second turboexpander generator is configured to decrease a temperature or pressure of a process stream flowing through the second turboexpander generator by generating electrical power from the process stream. The second turboexpander generator is downstream of and receives a flow output from the first turboexpander generator. The first turboexpander generator and the second turboexpander generator each include the following features. An electric stator surrounds an electric rotor. An annulus defined by the electric rotor and the electric stator is configured to receive a process fluid flow. Magnetic bearings carry the rotor within the stator. A housing encloses the rotor and stator. The housing is hermetically sealed between an inlet and an outlet of each turboexpander generator.

25 Claims, 7 Drawing Sheets

(51) Int. Cl.
*H02K 7/18* (2006.01)
*H02K 7/09* (2006.01)

(56) References Cited

U.S. PATENT DOCUMENTS

| | | | | |
|---|---|---|---|---|
| 6,560,988 | B2* | 5/2003 | Kimble | F17C 9/02 |
| | | | | 62/619 |
| 6,727,617 | B2 | 4/2004 | McMullen et al. | |
| 6,751,985 | B2* | 6/2004 | Kimble | F25J 1/0037 |
| | | | | 62/613 |
| 7,638,892 | B2* | 12/2009 | Myers | H02K 7/1823 |
| | | | | 290/52 |
| 7,861,548 | B2* | 1/2011 | Shibata | F01K 3/006 |
| | | | | 62/238.7 |
| 7,966,840 | B2* | 6/2011 | Shibata | B01D 19/0068 |
| | | | | 62/238.7 |
| 8,146,360 | B2 | 4/2012 | Myers et al. | |
| 8,226,358 | B2* | 7/2012 | Matsuo | F02B 37/025 |
| | | | | 415/212.1 |
| 8,400,005 | B2 | 3/2013 | Huber et al. | |
| 8,564,281 | B2 | 10/2013 | Filatov | |
| 8,739,538 | B2 | 6/2014 | Myers et al. | |
| 8,839,622 | B2 | 9/2014 | Myers et al. | |
| 9,316,433 | B2* | 4/2016 | Mak | F25J 3/0238 |
| 9,568,242 | B2* | 2/2017 | Mak | F25J 3/0209 |
| 9,932,843 | B2* | 4/2018 | Narehood | F01D 17/165 |
| 10,280,796 | B2* | 5/2019 | Dall'Ara | F02C 7/06 |
| 10,815,882 | B2* | 10/2020 | Marcucci | F25J 1/0287 |
| 10,895,165 | B2* | 1/2021 | Son | F01D 9/026 |
| 2003/0014981 | A1* | 1/2003 | Kimble | F17C 9/02 |
| | | | | 62/50.3 |
| 2003/0177785 | A1* | 9/2003 | Kimble | F25J 1/0022 |
| | | | | 62/613 |
| 2007/0000267 | A1* | 1/2007 | Shibata | B01D 19/0068 |
| | | | | 62/238.6 |
| 2008/0246281 | A1* | 10/2008 | Agrawal | F01D 15/005 |
| | | | | 415/177 |
| 2008/0252077 | A1* | 10/2008 | Myers | F01D 25/12 |
| | | | | 290/52 |
| 2009/0126377 | A1* | 5/2009 | Shibata | F22B 3/045 |
| | | | | 62/87 |
| 2009/0220335 | A1* | 9/2009 | Matsuo | F02C 6/12 |
| | | | | 415/164 |
| 2010/0011809 | A1* | 1/2010 | Mak | F25J 3/0209 |
| | | | | 62/635 |
| 2010/0237619 | A1 | 9/2010 | Pozivil et al. | |
| 2010/0301840 | A1 | 12/2010 | Filatov | |
| 2011/0239701 | A1* | 10/2011 | Kaart | F25J 1/0255 |
| | | | | 62/620 |
| 2011/0289922 | A1 | 12/2011 | Myers et al. | |
| 2012/0013125 | A1 | 1/2012 | Myers et al. | |
| 2012/0090351 | A1* | 4/2012 | Van De Lisdonk | F25J 1/0057 |
| | | | | 62/613 |
| 2012/0248786 | A1 | 10/2012 | Madison | |
| 2013/0039740 | A1 | 2/2013 | Hawkins | |
| 2015/0204603 | A1* | 7/2015 | Sheng | F25J 1/0052 |
| | | | | 62/614 |
| 2016/0187058 | A1* | 6/2016 | Mak | F25J 3/0242 |
| | | | | 62/621 |
| 2016/0230586 | A1 | 8/2016 | King et al. | |
| 2018/0030855 | A1* | 2/2018 | Dall'ara | H02K 9/00 |
| 2018/0171832 | A1 | 6/2018 | Kubo et al. | |
| 2018/0306109 | A1* | 10/2018 | Marcucci | H02P 9/06 |
| 2019/0101061 | A1 | 4/2019 | DiBenedetto | |
| 2020/0059179 | A1* | 2/2020 | Pearson | F02C 6/00 |

FOREIGN PATENT DOCUMENTS

| | | |
|---|---|---|
| JP | 2004303649 A | 10/2004 |
| WO | WO-2010142698 A1 | 12/2010 |

* cited by examiner

PRODUCING POWER WITH TURBOEXPANDER GENERATORS BASED ON SPECIFIED OUTPUT CONDITIONS

CROSS-REFERENCE TO RELATED APPLICATION(S)

This application is a continuation-in-part of and claims the benefit of priority to U.S. patent application Ser. No. 17/658,608, filed Apr. 8, 2022, the contents of which are hereby incorporated by reference.

TECHNICAL FIELD

This disclosure relates to electrical power generation.

BACKGROUND

Natural gas is one of the principal sources of energy for many of our day-to-day needs and activities. Natural gas is an attractive fossil fuel for its abundance. Hydrogen is a rapidly expanding global energy storage market. Hydrogen is used in many manufacturing processes, from petroleum refining to food processing. Hydrogen is also used as a fuel source for gas turbines and in a broad range of fuel cells to generate electricity in industrial and consumer transportation sectors.

The efficient and effective movement of such gases from producing regions to consumption regions requires an extensive and elaborate transportation system. Natural gas that is transported through pipelines travels at high pressure in the pipeline.

SUMMARY

This disclosure relates to producing power with turboexpander generators based on specified output conditions.

An example implementation of the subject matter described within this disclosure is a system with the following features. A first turboexpander generator is configured to decrease a temperature or pressure of a process stream flowing through the first turboexpander generator by generating electrical power from the process stream. A second turboexpander generator is configured to decrease a temperature or pressure of a process stream flowing through the second turboexpander generator by generating electrical power from the process stream. The second turboexpander generator is downstream of and receives a flow output from the first turboexpander generator. The first turboexpander generator and the second turboexpander generator each include the following features. An electric stator surrounds an electric rotor. An annulus defined by the electric rotor and the electric stator is configured to receive a process fluid flow. Magnetic bearings carry the rotor within the stator. A portion of the magnetic bearings are supported by the stator. A housing encloses the rotor and stator. The housing is hermetically sealed between an inlet and an outlet of each turboexpander generator.

Aspects of the example system, that can be combined with the example system alone or in combination with other aspects, include the following. The first and the second turboexpander generator being substantially identical in critical dimensions and performance.

Aspects of the example system, that can be combined with the example system alone or in combination with other aspects, include the following. A controller is configured to regulate the first turboexpander generator and the second turboexpander generator.

Aspects of the example system, that can be combined with the example system alone or in combination with other aspects, include the following. The inlet and the outlet of each turboexpander are centered on a same longitudinal axis of each turboexpander generator.

Aspects of the example system, that can be combined with the example system alone or in combination with other aspects, include the following. The stator includes variable stator vanes configured to throttle fluid flow through the first turboexpander generator or the second turboexpander generator.

Aspects of the example system, that can be combined with the example system alone or in combination with other aspects, include the following. A flow control valve is upstream of the first turboexpander generator. The flow control valve is configured to regulate a flow-rate through the first turboexpander generator and the second turboexpander generator.

Aspects of the example system, that can be combined with the example system alone or in combination with other aspects, include the following. A Joule-Thomson valve defines a portion of a third conduit flow passage arranged to carry fluid flow in series with the first turboexpander generator and the second turboexpander generator.

An example implementation of the subject matter described within this disclosure is a method with the following features. A fluid flow is received by a first turboexpander generator defining a first portion of a conduit flow passage. The fluid flow flows through an annulus defined by an electric rotor and an electric stator of the first turboexpander generator. The fluid flow is received by a second turboexpander generator from an outlet of the first turboexpander generator. The second turboexpander generator defines a second portion of the conduit flow passage.

Aspects of the example method, that can be combined with the example method alone or in combination with other aspects, include the following. The fluid flow includes hydrocarbon gas.

Aspects of the example method, that can be combined with the example method alone or in combination with other aspects, include the following. The fluid flow includes hydrogen gas.

Aspects of the example method, that can be combined with the example method alone or in combination with other aspects, include the following. The fluid flow includes air.

Aspects of the example method, that can be combined with the example method alone or in combination with other aspects, include the following. The first turboexpander generator and the second turboexpander generator are substantially identical in performance and critical dimensions.

Aspects of the example method, that can be combined with the example method alone or in combination with other aspects, include the following. Electrical power is generated by the first turboexpander generator.

Aspects of the example method, that can be combined with the example method alone or in combination with other aspects, include the following. Generating electrical power is ceased by the first turboexpander generator responsive to a change in specified downstream conditions.

Aspects of the example method, that can be combined with the example method alone or in combination with other aspects, include the following. Generating electrical power by the first turboexpander generator includes adjusting flow rate, by a flow control valve, based on specified downstream conditions.

Aspects of the example method, that can be combined with the example method alone or in combination with other aspects, include the following. Electrical power produced by the first turboexpander generator or the second turboexpander generator is directed towards an electrical user separate from a user of the fluid flow.

An example implementation of the subject matter described within this disclosure is a system with the following features. A conduit includes a first turboexpander generator configured to decrease a temperature or pressure of a process stream flowing through the first turboexpander generator by generating electrical power from the process stream. A second turboexpander generator is configured to decrease a temperature or pressure of a process stream flowing through the second turboexpander generator by generating electrical power from the process stream. The second turboexpander generator is downstream of and receives a flow output of the first turboexpander generator. The first turboexpander generator and the second turboexpander generator each include the following features. A stator surrounds the rotor. An annulus defined by the electric rotor and the electric stator is configured to receive a process fluid flow. Magnetic bearings carry the rotor within the stator. A portion of the magnetic bearings are supported by the stator. A housing encloses the rotor and stator. The housing is hermetically sealed between an inlet and an outlet of each turboexpander generator. A Joule-Thomson valve is downstream or upstream of the first turboexpander generator or the second turboexpander generator. The Joule-Thomson valve is configured to receive a same flow as the first turboexpander generator and the second turboexpander generator. A controller is configured to regulate the first turboexpander generator and the second turboexpander generator.

Aspects of the example system, that can be combined with the example system alone or in combination with other aspects, include the following. The stator includes variable stator vanes configured to throttle fluid flow through the first turboexpander generator or the second turboexpander generator.

Aspects of the example system, that can be combined with the example system alone or in combination with other aspects, include the following. The first and the second turboexpander generator are substantially identical in critical dimensions and performance.

Aspects of the example system, that can be combined with the example system alone or in combination with other aspects, include the following. A flow control valve is upstream of the first turboexpander generator. The flow control valve is configured to regulate a flow-rate through the first turboexpander generator, the second turboexpander generator, and the Joule-Thomson valve.

Aspects of the example system, that can be combined with the example system alone or in combination with other aspects, include the following. A third turboexpander generator is included.

Aspects of the example system, that can be combined with the example system alone or in combination with other aspects, include the following. The third turboexpander generator is arranged to carry a same fluid flow as the first turboexpander generator, second turboexpander generator, and the Joule-Thomson valve.

Aspects of the example system, that can be combined with the example system alone or in combination with other aspects, include the following. The conduit is a first conduit. The third turboexpander generator is within a second conduit fluidically parallel to the first conduit.

Aspects of the example system, that can be combined with the example system alone or in combination with other aspects, include the following. The controller is further configured to receive a data stream indicative of a process condition downstream of the first turboexpander generator and the second turboexpander generator, and adjust a flow rate, by a flow control valve, based on one or more specified downstream conditions.

Aspects of the example system, that can be combined with the example system alone or in combination with other aspects, include the following. The controller is further configured to condition electrical power produced by the first turboexpander generator and the second turboexpander generator, and direct power into an electrical grid, the power being in-phase with the electrical grid.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city, or district networks or on-site industrial plant networks. To deliver the gas safely through local distribution networks and for use, the process gas is depressurized to lower levels (often using pressure regulators, such as Joule-Thomson valves). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping.

A turboexpander generator can be installed to recover the wasted energy from pressure reduction and produce electrical power. The electrical power can be directed to a power grid or elsewhere at the PLD station. In implementations where the electrical power is directed to a power grid, the power grid can include a local grid for the facility, a local, isolated grid, or a municipal grid. In some implementations, power generated by the turboexpander generator is sold to a municipal electric provider. Similarly, a turboexpander generator can be installed at a gas storage facility upstream of one or more storage tanks to recover high-pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

Figure 1:
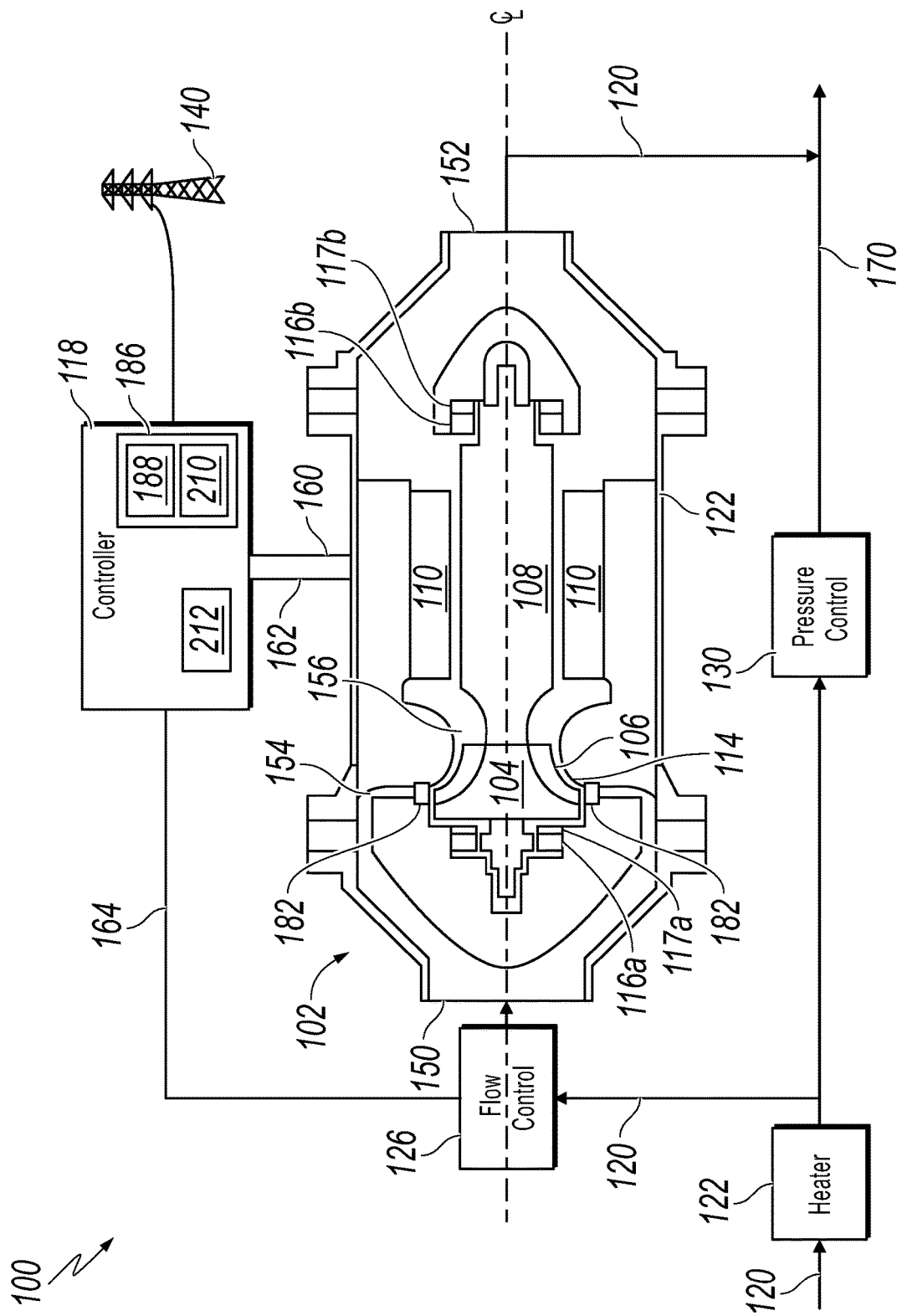
FIG. 1 is a cross-sectional schematic diagram of an electrical power generation system with a turboexpander generator coupled to a power grid.

FIG. 1 is a cross-sectional schematic diagram of an electrical power generation system 100 with a turboexpander generator 102 coupled to a power grid 140. The electrical power generation system 100 can be added at a PLD station to capture energy from gas expansion from the PLD process, or in any of the other applications described above. The electrical power generation system 100 includes a turboexpander generator 102 in parallel with a pressure control 130. The turboexpander generator 102 is arranged axially so that the turboexpander generator 102 can be mounted in-line with a pipe. In other words, the inlet 150 and the outlet 152 of the turboexpander generator 102 are centered on a same longitudinal axis (centerline 180) of the turboexpander generator 102. The turboexpander generator 102 acts as an electric generator by generating electrical energy from rotational kinetic energy derived from expansion of a process gas 120 through a turbine wheel 104. For example, rotation of the turbine wheel 104 can be used to rotate a rotor 108 within a stator 110, which then generates electrical power.

The turboexpander generator 102 includes a high-performance, high-speed permanent magnet generator with an integrated radial in-flow expansion turbine wheel 104 and low-loss active magnetic bearings (AMBs) 116a and 116b. The rotor assembly includes a permanent magnet section with the turbine wheel 104 mounted directly to the rotor hub. The rotor 108 is levitated by the magnetic bearing system creating a frictionless (or near frictionless) interface between dynamic and static components. The AMBs 116a,b facilitate a lossless (or near lossless) rotation of the rotor 108.

The turboexpander generator 102 is designed to have a process gas 120 flow through the system 100, which cools the generator and eliminates the need for auxiliary cooling equipment. The turboexpander controller 118 for the turboexpander generator 102 combines a power converter 186 and magnetic bearing controller (MBC) 212 into one cabinet, in some implementations. The power converter 186 allows for a consistent and clean delivery of generated power from the turboexpander generator 102 to a power grid 140. The power converter 186 regulates the frequency and amplitude of the generated current to match the local grid. In some implementations, the power converter 186 acts as a power regenerator converting electricity produced by the turboexpander generator 102 to DC electricity, then generating an AC waveform of a phase, frequency, and voltage to synch and distribute to the power grid 140. After expansion, the process gas 120 exits the turboexpander generator 102 along the same axial path for downstream processes.

The turboexpander generator 102 includes a flow-through configuration. The flow-through configuration permits the process gas 120 to flow from an inlet side of the turboexpander generator 102 to an outlet side of the turboexpander generator 102. The process gas 120 flows into a radial gas inlet 154 to the turbine wheel 104 and out of the turbine wheel 104 from an axial gas outlet 156. In some implementations, the stator includes variable stator vanes 182 at the inlet 154. The variable stator vanes 182 are configured to throttle fluid flow through the turboexpander generator 102 and can be used as an alternative or addition to the flow control 126. The process gas 120 then flows through the generator and out of the inlet 154, where the process gas 120 rejoins the gas pipeline 170. Generally, process gas 120 is directed to flow into the turboexpander generator 102 through a flow control system 126. The flow control system 126 includes a flow or mass control valve and an emergency shut off valve. Flow control system 126 can be controlled by turboexpander controller 118 or other electrical, mechanical, or electromagnetic signal. For example, a fault condition can signal the flow control system 126 to close or partially close, thereby removing or restricting gas supply to the turboexpander generator 102. Restricting or removing gas flow to the turboexpander while maintaining a constant rotational speed of the turbine wheel reduces the power output from the turboexpander generator 102. In the example shown in FIG. 1, a signal channel 164 from the turboexpander controller 118 can be used to open and/or close the flow control system 126. In some implementations, the turboexpander housing 112 is hermetically sealed between the inlet 150 and the outlet 152.

The process gas 120 is expanded by flowing across the turbine wheel 104, resulting in a pressure letdown of the process gas 120. The process gas 120 exits the turboexpander generator 102 at a decreased pressure and/or temperature. The expansion of the process gas 120 across the turbine wheel 104 causes the turbine wheel 104 to rotate, which causes the rotor 108 to rotate. The rotation of the rotor 108 within the stator 110 generates electrical power. The turboexpander generator 102 achieves the specified pressure letdown and captures the energy from the pressure letdown to generate electrical power. A pressure control valve 130, such as a conventional pressure regulator or a Joule-Thomson valve, can be installed in parallel to (or in series with) the turboexpander generator 102. The pressure control valve 130 can be used to control the pressure of the process gas 120 that flows through the turboexpander generator 102. Any excess high-pressure process gas 120 that is not directed into the turboexpander generator 102 can be directed through the pressure control valve 130.

In some implementations, a heater 122 can heat the process gas 120 prior to flowing the process gas 120 into the turboexpander generator 102. For example, if the expansion of the process gas 120 through the turbine wheel 104 lowers the temperature of the process gas 120 to a point where moisture in the process gas 120 freezes at the turbine wheel 104 or another downstream location, the process gas 120 can be heated by heater 122 prior to entering the turboexpander generator 102. After heating, the process gas 120 can then be directed into the turboexpander generator 102. The heating of the process gas 120 can prevent freezing moisture as the process gas 120 expands and its temperature drops. In some implementations, the process gas is heated by a heater after exiting the turboexpander 102.

The turboexpander generator 102 includes a turbine wheel 104. The turbine wheel 104 is shown as a radial inflow turbine wheel, though other configurations are within the scope of this disclosure, such as axial flow turbine wheels. In this example, the process gas 120 is received from an inlet conduit 150 of the housing 112 and enters a radially oriented inlet 154 of the turbine wheel 104. In some implementations, the process gas 120 flows through an inlet conduit 150 and is diverted by a flow diverter to a radial inlet 154 that directs the fluid into the radial inflow of the turbine wheel 104. After expanding, the process gas 120 exits the turbine wheel 104 from an axially oriented outlet 156 to outlet conduit 152 of the housing 112.

In some implementations, the turbine wheel 104 is directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. In some implementations, the turbine wheel 104 and rotor 108 are coupled without a gearbox and rotate at the same speed. In some implementations, the turbine wheel 104 is indirectly coupled to the rotor 108, for example, by a gear train, clutch mechanism, or other manner.

The turbine wheel 104 includes a plurality of turbine wheel blades 106 extending outwardly from a hub and that interact with the expanding process gas 120 to cause the turbine wheel 104 to rotate. FIG. 1 shows an unshrouded turbine wheel 104, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an unshrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas 120 therebetween, as the process gas 120 flows through the turbine wheel 104. Although some amount of the process gas 120 may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In some implementations, the housing 112 is hermetically sealed to prevent process gas 120 from escaping the radial inlet 154 of the turbine wheel 104.

The shroud 114 may reside at a specified distance away from the turbine wheel blades 106, and is maintained at a distance away from the turbine wheel blades 106 during operation of the turboexpander generator 102 by using magnetic positioning devices, including active magnetic bearings and position sensors.

Bearings 116a and 116b are arranged to rotatably support and carry the rotor 108 and turbine wheel 104 relative to the stator 110 and the shroud 114. In some implementations, the turbine wheel 104 is supported in a cantilevered (overhung) manner by the bearings 116a and 116b. In some implementations, the turbine wheel 104 is supported in a non-cantilevered manner and bearings 116a and 116b may be located on the outlet side of turbine wheel 104, for example with a between bearing arrangement. In some implementations, one or more of the bearings 116a or 116b includes ball bearings, needle bearings, magnetic bearings, foil bearings, journal bearings, or others.

Bearings 116a and 116b may be a combination of radial and thrust bearing, supporting the rotor 108 in radial and axial directions. Other configurations could be utilized. The bearings 116a and 116b need not be the same types of bearings.

In implementations in which the bearings 116a and 116b are magnetic bearings, a magnetic bearing controller (MBC) 212 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 212 may receive information from the position sensor(s) 117a, 117b and process that information to provide control signals to the magnetic bearings 116a, 116b. MBC 212 can communicate with the various components of the turboexpander generator 102 across a communications channel 162.

The use of magnetic bearings 116a, 116b and position sensors 117a, 117b is to maintain and/or adjust the position of the turbine wheel blades 106 such that the turbine wheel blades 106 stay in close proximity to the shroud 114, permitting the turboexpander generator 102 to operate without the need for bearing seals (e.g., without the need for dynamic seals). The use of the active magnetic bearings 116a, 116b in the turboexpander generator 102 eliminates physical contact between rotating and stationary components, as well as reduce or eliminate a need for lubrication, lubrication systems, and seals.

In some implementations, the turboexpander generator 102 includes one or more backup bearings. For example, at start-up and shut-down or in the event of a power outage that affects the operation of the magnetic bearings 116a and 116b, bearings may be used to rotatably support the turbine wheel 104 during that period of time. The backup bearings and may include ball bearings, needle bearings, journal bearings, or the like.

As mentioned previously, the turboexpander generator 102 is configured to generate electrical power in response to the rotation of the rotor 108. In certain instances, the rotor 108 can include one or more permanent magnets. The stator 110 includes a plurality of conductive coils. Electrical power is generated by the rotation of the magnet within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator 110. At any instant, the magnitude of the voltage induced in stator coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander generator 102 is configured to generate electrical power at that speed. Such a turboexpander generator 102 is what is referred to as a "high speed" turbine generator. For example, the turboexpander generator 102 can produce up to 135 kW at a continuous speed of 30,000 rpm. In some implementations, the turboexpander produces on the order of 315 kW at higher rotational speeds (e.g., on the order of 23,000 rpm).

In some implementations, the design of the turbine wheel 104 are based on a specified parameter of the output gas from the turboexpander generator 102. For example, the design of the rotor and stator can be based on a specified temperature of the process gas 120 exiting the turboexpander generator 102. In some implementations, the turboexpander generator is constructed in a single size with an interchangeable turbine wheel 400 that can be changed-out for the specified output and process.

The turboexpander generator 102 is coupled to turboexpander controller 118. Turboexpander controller 118 can include a variety of components, for example, a power converter 186, and/or the magnetic bearing controller (MBC) 212 (discussed above). The power converter 186 can be, for example, a variable speed drive (VSD) or a variable frequency drive.

The electrical output 160 of the turboexpander generator 102 is connected to the power converter 186, which can be programmed to specific power requirements. In some implementations, the power converter 186 can include an insulated-gate bipolar transistor (IGBT) rectifier 188 to convert the variable frequency, high-voltage output from the turboexpander generator 102 to a direct current (DC). In some implementations, the rectifier 188 is a three-phase rectifier for three-phase AC input current. An inverter 210 then converts the DC from the rectifier 188 to AC for supplying to the power grid 140. In certain implementations, the inverter 210 converts the DC to 380 VAC-480 VAC at 50 to 60 Hz for delivery to the power grid 140. The specific output of the power converter 186 depends on the power grid 140 and application. Other conversion values are within the scope of this disclosure. The power converter 186 matches its output to the power grid 140 by sampling the grid voltage and frequency, and then changing the output voltage, phase, and frequency of the inverter 210 to match, or synchronize to, the sampled power grid voltage, phase, and frequency.

In some implementations, the power converter 186 is a bidirectional power converter. In such implementations, the rectifier 188 can receive an alternating current from the power grid 140 and convert the alternating current into a direct current. The inverter 210 can then convert DC from the rectifier 188 to AC for supplying to the generator. In such implementations, power can be delivered from the power grid 140 to the generator to drive rotation of the rotor 108, and in turn, the turbine wheel 104 to induce flow of a process gas. In sum, in implementations in which the power converter 186 is a bidirectional power converter, the flow of power can be reversed and used by the generator to induce flow of a process gas (as opposed to the process gas contributing expansion work to generate power).

The turboexpander generator 102 is also connected to the MBC 212 in the turboexpander controller 118. The MBC 212 constantly monitors position, current, temperature, and other parameters to control the turboexpander generator 102 and the active magnetic bearings 116a and 116b. For example, the MBC 212 is coupled to position sensors 117a, 117b to monitor radial and axial position of the turbine wheel 104 and the rotor 108. The MBC 212 can control the magnetic bearings 116a, 116b to selectively change the stiffness and damping characteristics of the magnetic bearings 116a, 116b as a function of spin speed. The MBC 212 can also control synchronous cancellation, including automatic balancing control, adaptive vibration control, adaptive vibration rejection, and unbalance force rejection control.

Figure 2:
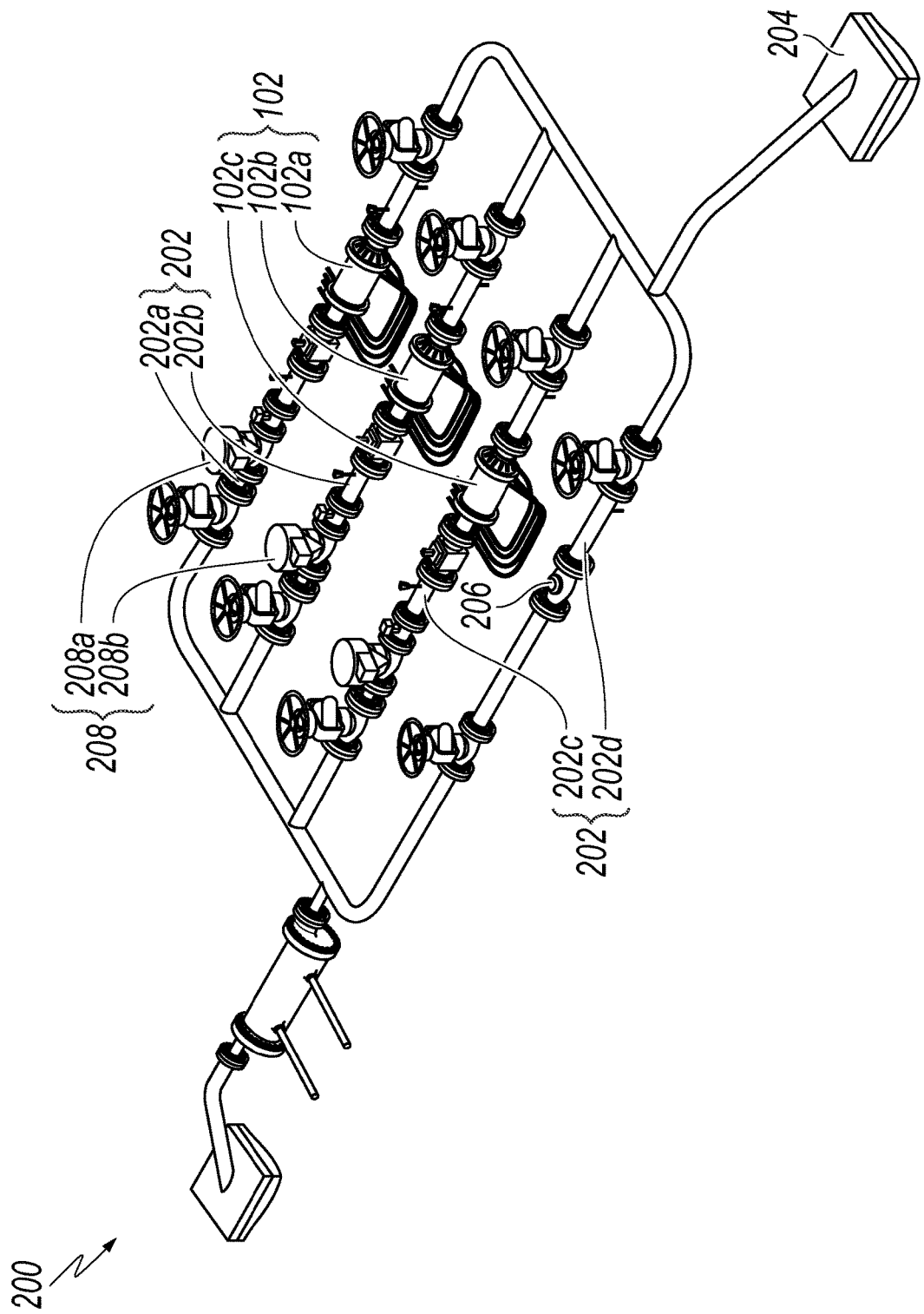
FIG. 2 is a perspective view of an example system arrangement that includes three turboexpander generators plumbed in parallel to one another.

FIG. 2 is a perspective view of an example system 200 that includes two turboexpander generators 102 plumbed in parallel to one another. That is, fluid flow is able to flow through a first turboexpander generator 102a or a second turboexpander generator 102b, but not both. In some implementations, such an arrangement is used in situations where a high-flow requirement and a low-pressure drop requirement exist. The turboexpander 102 previously described can be used as any of the turboexpander generators described throughout this disclosure. The system 200 includes the first turboexpander generator 102a, which defines a portion of a first conduit flow passage 202a. The first turboexpander generator is configured to decrease a temperature or pressure of a process stream flowing through the first turboexpander generator 102a by generating electrical power from the process stream. That is, the turboexpander generator converts the mechanical energy present in the fluid flow to electrical energy, and converts a specified amount of energy to produce fluid conditions specified for a downstream user 204. In some implementations, the downstream user includes a pipeline. In general, the first turboexpander generator 102a and the second turboexpander generator 102b are configured to regulate (fully or partially) a pressure or temperature specified for the downstream user 204.

The second turboexpander generator 102b defines a portion of a second conduit flow passage 202b. The first conduit flow passage 202a and second conduit flow passage 202b (as well as the first turboexpander generator 102a and the second turboexpander generator 102b are arranged to carry fluid flow in parallel to one another). The second turboexpander generator is identical or substantially similar to the first turboexpander generator 102a (e.g., in topology, performance characteristics and/or critical dimensions, such as one or more of power output, electric stator dimensions and/or electromagnetic characteristics, rotor magnetic characteristics and/or dimensions, turbine wheel aerodynamic characteristics and/or dimensions, turboexpander performance, housing aerodynamic characteristics and/or internal dimensions, total overall length, etc.) with the exception of any differences described herein. To the extent the second turboexpander generator 102b is substantially similar, but not identical, to the first turboexpander generator 1021, the differences in performance and dimensions can, in certain instances, be within 10% of that of the first turboexpander generator 102a.

In some implementations, additional parallel flow passages 202 are included with the system 200. For example, in some implementations, a Joule-Thomson valve 206 defines a portion of a third conduit flow passage 202d. The third conduit flow passage 202d is arranged to flow or carry fluid parallel to the first conduit flow passage 202a and the second conduit flow passage 202b.

In some implementations, the system 200 can include greater or fewer turboexpander generators. For example, in some implementations, a third turboexpander generator 102c defines a portion of a fourth conduit flow passage 202c that is arranged to carry fluid flow in parallel to the first conduit flow passage 202a, second conduit flow passage 202b, and the third conduit flow passage 202d. While specific examples and arrangements are described throughout this disclosure, any number of turboexpander generators 102 and Joule-Thomson valves 206 can be arranged in parallel to one another without departing from this disclosure.

Regardless of the number of turboexpander generators used, all or some of the turboexpander generators, in some implementations, include a flow control valve 208. A flow control valve 208 regulates a flow rate through whichever turboexpander generator 102 is in series with the flow control valve. A flow control valve 208 can be included upstream or downstream of the turboexpander generator 102 that is being regulated by the flow control valve. For example, a first flow control valve 208a is upstream of the first turboexpander generator 102a and regulates (fully or partially) a flow-rate through the first turboexpander generator 102a. Alternatively or in addition, in some implementations, a second flow control valve 202b is upstream of the second turboexpander generator 102b. The second flow control valve 208b regulates a flow-rate through the second turboexpander generator 102b.

Figure 3:
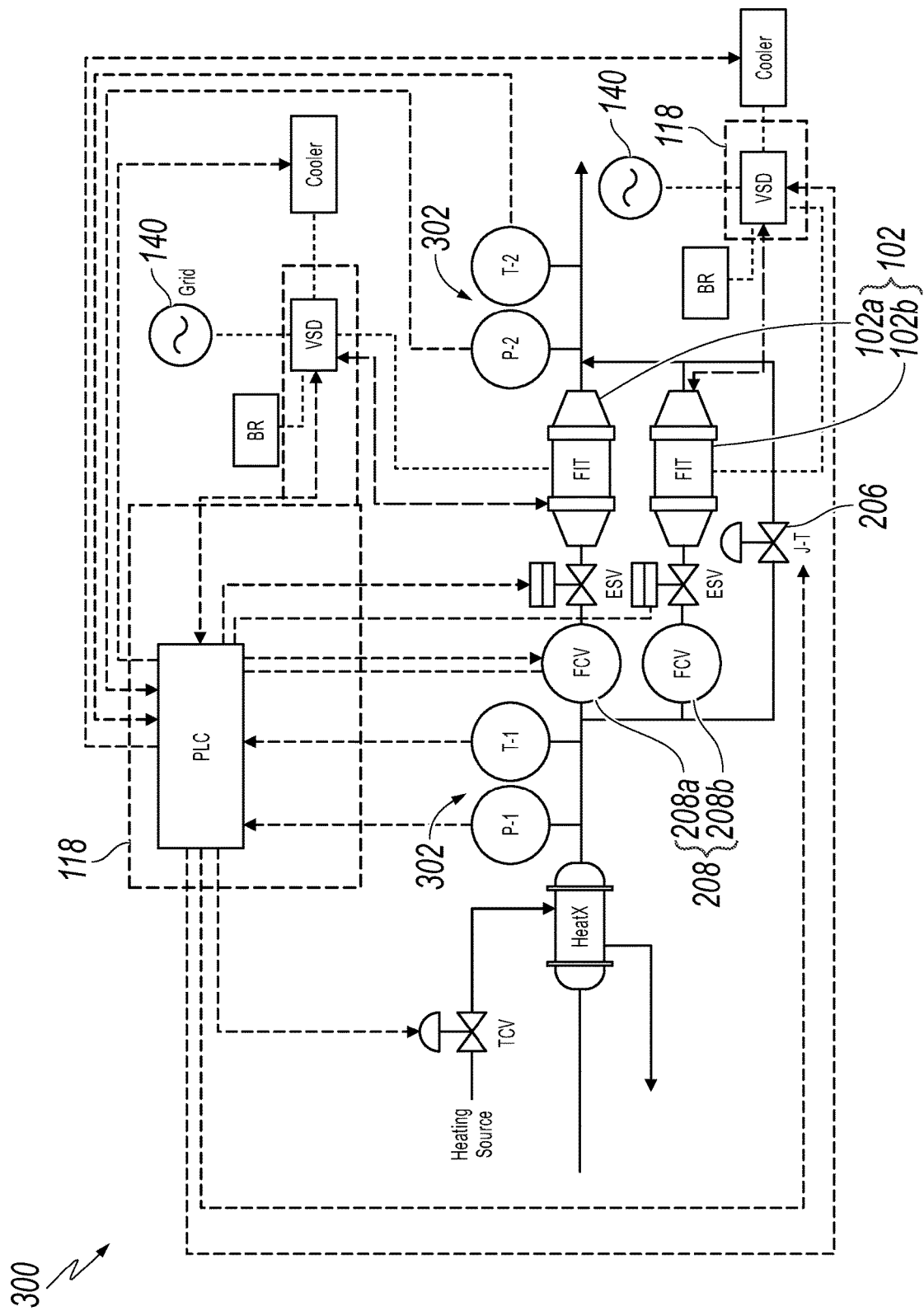
FIG. 3 is a schematic block diagram of an example system arrangement that includes two turboexpander generators plumbed in parallel to one another.

FIG. 3 is a schematic block diagram of an example system 300 arrangement that includes the two turboexpander generators (102a, 102b) plumbed in parallel to one another. The system includes a controller 118. The controller 118 is coupled to a variety of components within the system 300, for example, the turboexpander generators 102, the flow control valves 208, various sensors 302, and a power grid 140. In operation, the controller is configured to receive a data stream indicative of a process condition downstream of the first turboexpander generator 102a and the second turboexpander generator 102b. The controller 118 is configured to regulate the first turboexpander generator 102a generator and the second turboexpander generator 102b. For example, in some instances, the controller 118 adjusts a flow rate, by a flow control valve 208, based on one or more specified or required downstream conditions. In some instances, the controller 118 adjusts an electrical load on one or more turboexpander generators 102 based on the one or more specified or required downstream conditions.

In some implementations, the controller is configured to condition electrical power produced by the first turboexpander generator 102a and the second turboexpander generator 102b. For example, in some implementations, the controller adjusts a voltage, current, or phase of electricity produced by the turboexpander generators 102. Such conditioning allows the controller to then direct in-phase electrical power into the electrical grid.

Figure 4:
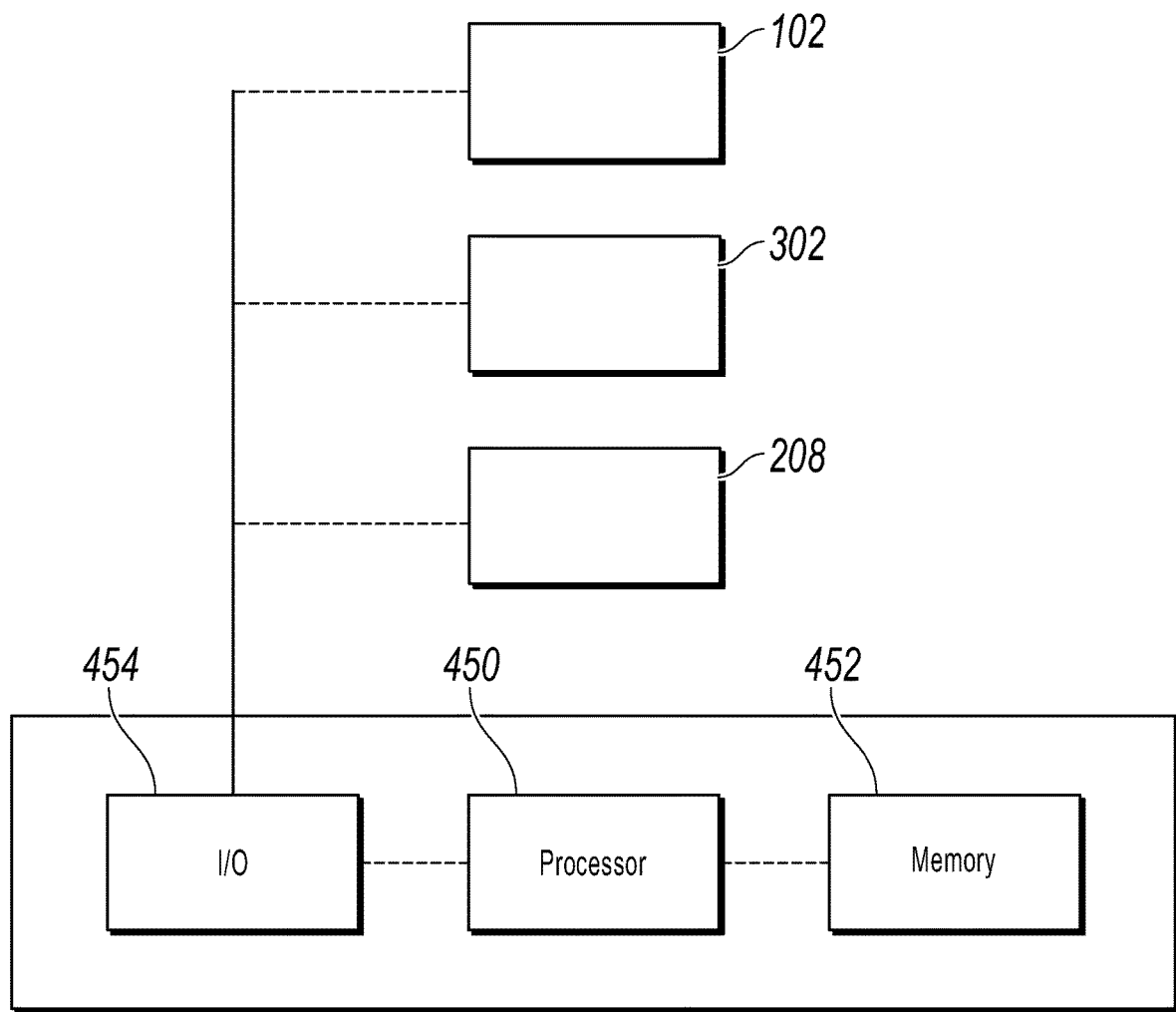
FIG. 4 is a block diagram of an example controller that can be used with aspects of this disclosure.

FIG. 4 is a block diagram of an example controller 118 that can be used within the context of this disclosure. The controller 118 can, among other things, monitor parameters of the system and send signals to actuate and/or adjust various operating parameters of the system. As shown in FIG. 4, the controller 118, in certain instances, includes a processor 450 (e.g., implemented as one processor or multiple processors) and a memory 452 (e.g., implemented as one memory or multiple memories) containing instructions that cause the processors 450 to perform operations described herein. The processors 450 are coupled to an input/output (I/O) interface 454 for sending and receiving communications with components in the system, including, for example, the sensors 302. In certain instances, the controller 118 can additionally communicate status with and send actuation and/or control signals to one or more of the various system components (including the flow control valves 208) of the system 100, as well as other sensors 302 (e.g., pressure sensors, temperature sensors, vibration sensors, and other types of sensors) provided in any of the systems described herein. In certain instances, the controller 118 can communicate status and send actuation and control signals to one or more of the components within the system, such as the flow control valve 208. The communications can be hard-wired, wireless or a combination of wired and wireless. In some implementations, controllers similar to the controller 118 can be located elsewhere, such as in a data van, elsewhere on a site or even remote from the site. In some implementations, the controller 118 can be a distributed controller with different portions located about a site or off site. For example, in certain instances, the controller 118 can be located at the turboexpander generator 102, or it can be located in a separate control room or data van. Additional controllers can be used throughout the site as stand-alone controllers or networked controllers without departing from this disclosure.

The controller 118 can operate in monitoring, commanding, and using the turboexpander generator 102 for adjusting process conditions for a downstream user 204 and generating electricity. To monitor and control the vortex turboexpander generator 102, the controller 118 is used in conjunction with various sensors both at the turboexpander generator and at the downstream user. Input and output signals, including the data from the sensors, controlled and monitored by the controller 118, can be logged continuously by the controller 118.

The controller 118 can have varying levels of autonomy for controlling the turboexpander generators 102. For example, the controller 118 can begin sensing a change in the process conditions of the downstream user 204, and an operator adjusts the flow control valve 208 or electrical load of the turboexpander generator 102. Alternatively, the controller 118 can begin sensing a change in the process conditions of the downstream user 204, receive an additional input from an operator, and begin adjusting the flow control valve 208 or electrical load of the turboexpander generator 102 with no other input from the operator. Alternatively, the controller 118 can begin sensing a change in the process conditions of the downstream user 204 and adjust the flow control valve 208 or electrical load of the turboexpander generator 102 with no input from an operator.

Figure 5:
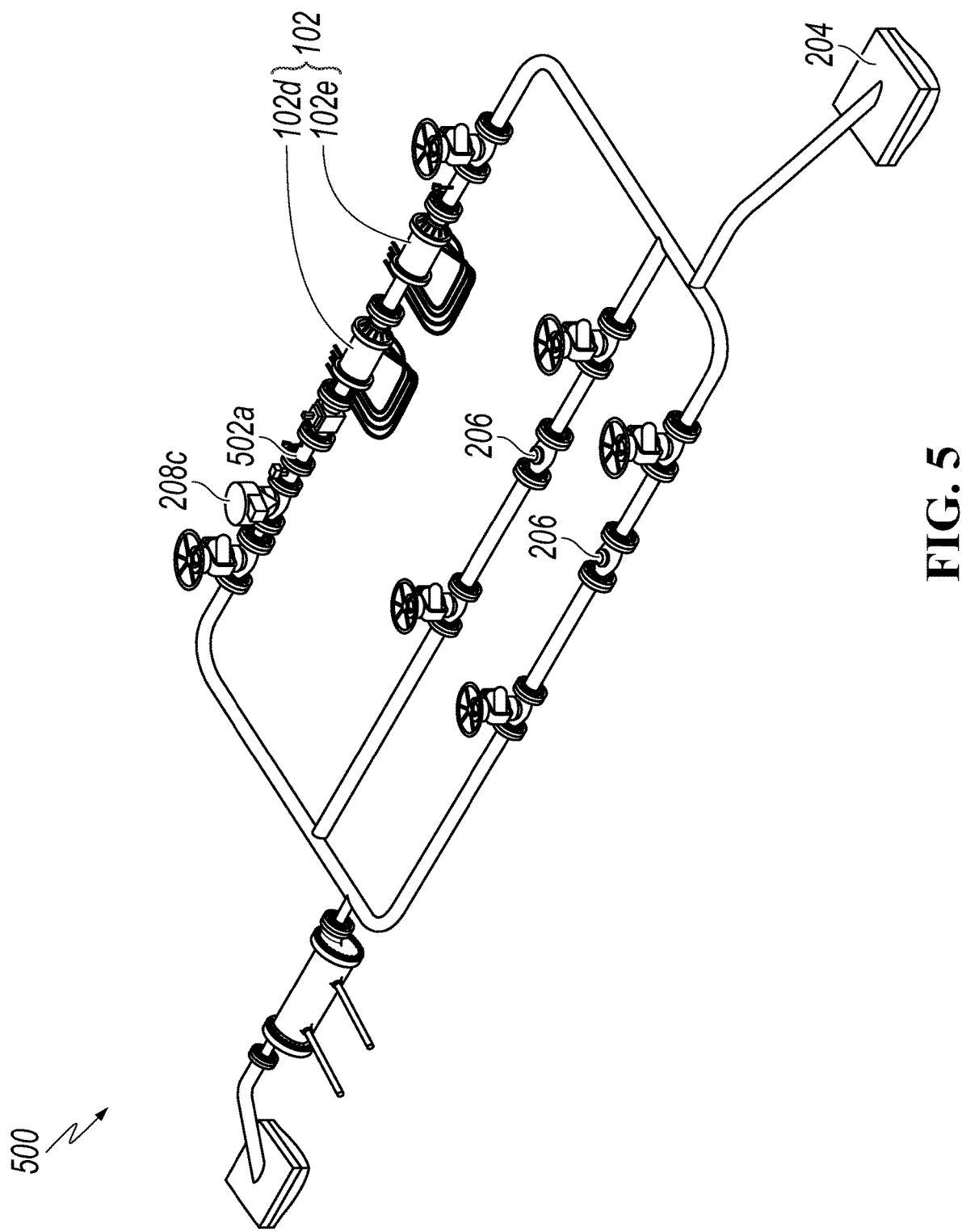
FIG. 5 is a perspective view of an example system arrangement that includes two turboexpander generators plumbed in series with one another.

FIG. 5 is a perspective view of an example system 500 arrangement that includes two turboexpander generators 102 plumbed in series with one another. That is, fluid flows through a first turboexpander generator 102d, then a second turboexpander 102e. The fluid flow always goes through both the first turboexpander generator 102d and the second turboexpander 102e sequentially during normal operations. In some implementations, such an arrangement is used in situations where a high-pressure drop requirement exist. The system 500 is substantially similar to system 200 and system 300 previously described with the exception of any differences described herein or illustrated in the associated figures. In some implementations, the first turboexpander generator 102d and the second turboexpander generator 102e are substantially similar in critical dimension and performance metrics. In some implementations, the first turboexpander generator 102d and the second turboexpander generator 102e are different in critical dimension and performance metrics. The first turboexpander generator 102d defines a first portion of a conduit flow passage 502a, and a second turboexpander generator 102e defines a second portion of the conduit flow passage 502a. The first portion and second portion of the conduit flow passage 502a are arranged to carry fluid flow in series with one another. A user 204 is downstream of the first turboexpander generator 102d and the second turboexpander generator 102e. The first turboexpander generator 102d and the second turboexpander generator 102e are configured to (fully or partially) regulate a pressure or temperature specified for the downstream user 204. It should be noted that the first turboexpander generator 102d and the second turboexpander generator 102e share a same flow control valve 208c as mass flow between the first turboexpander generator 102d and the second turboexpander generator 102e are equal.

Figure 6:
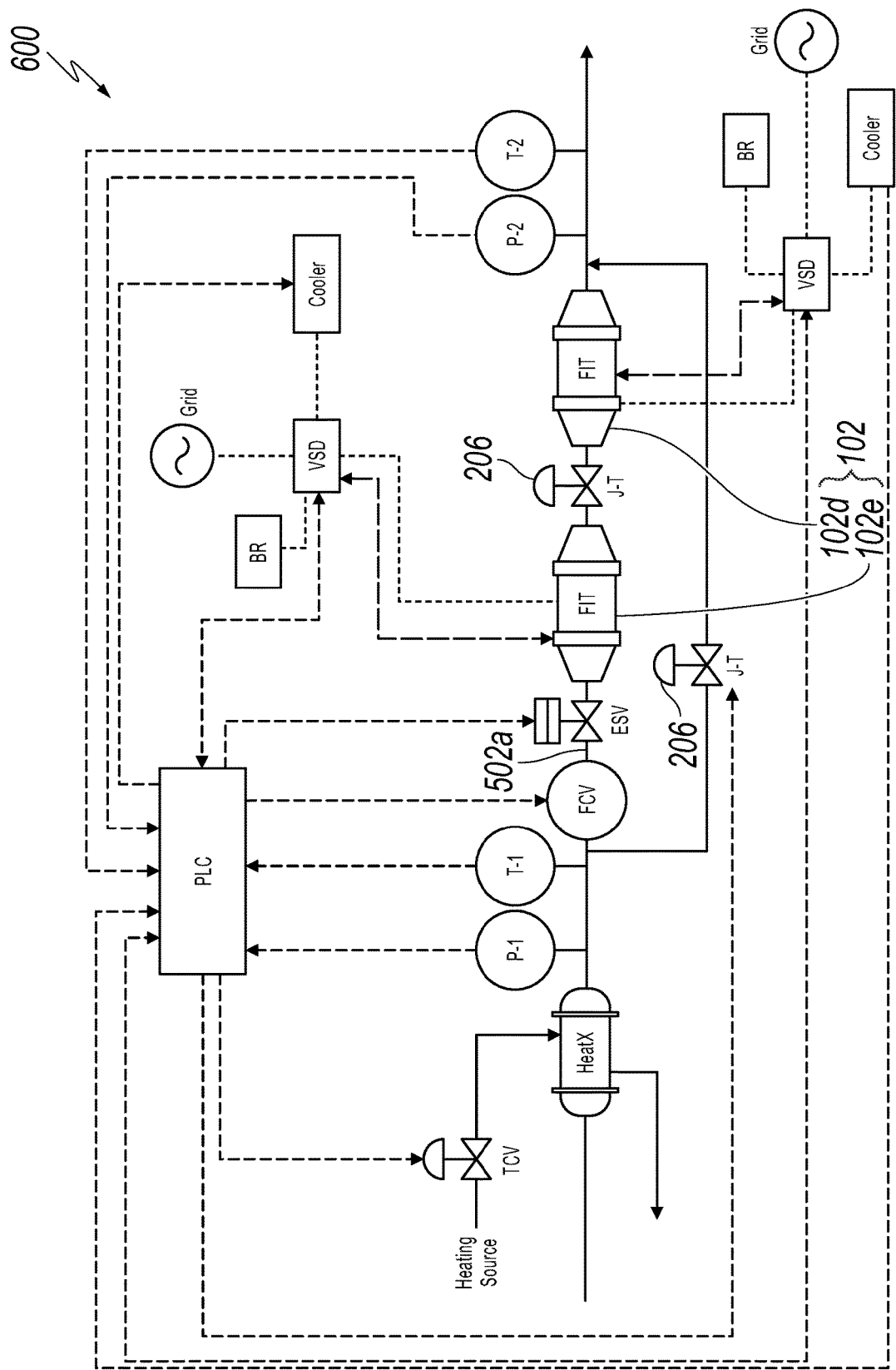
FIG. 6 is a schematic block diagram of an example system arrangement that includes two turboexpander generators plumbed in series with one another.

FIG. 6 is a schematic block diagram of an example system 600 arrangement that includes two turboexpander generators 102d and 102e plumbed in series with one another. In some implementations, a Joule-Thomson valve 206 defines a third portion of a conduit flow passage 502a. A controller is configured to regulate the first turboexpander generator 102d and the second turboexpander generator 102e. The controller 118 is substantially similar to controller 118 previously described.

Figure 7:
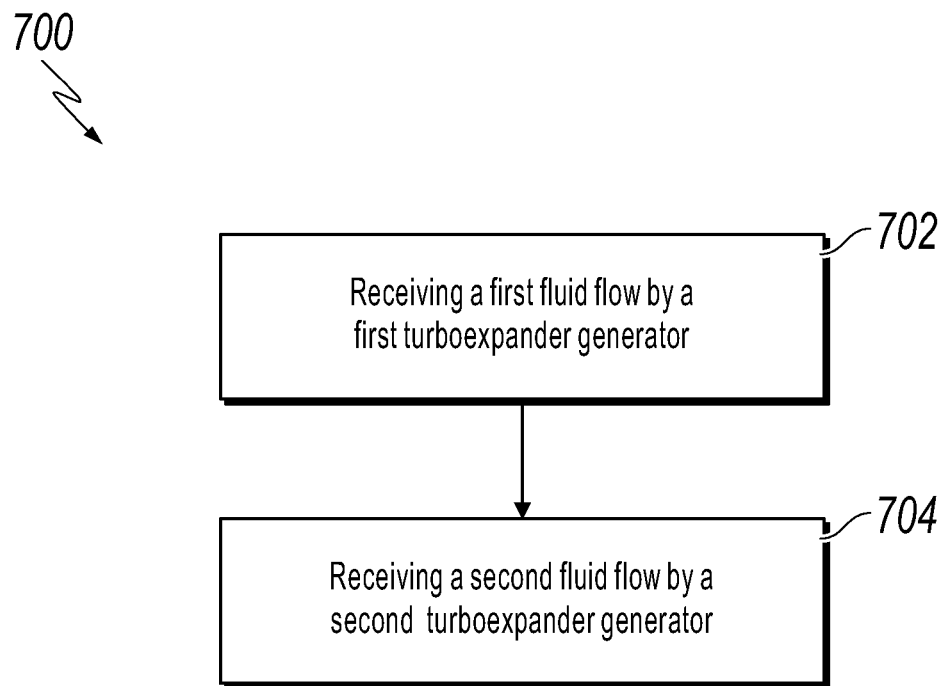
FIG. 7 is a flowchart of an example method that can be used with aspects of this disclosure.

FIG. 7 is a flowchart of an example method 700 that can be used with aspects of this disclosure. At 702, a first fluid flow is received by a first turboexpander generator. At 704, a second fluid flow is received by a second turboexpander generator. In some implementations, the first turboexpander generator and the second turboexpander generator define a first portion and a second portion of a conduit flow passage. That is, the first portion and second portion of the conduit flow passage are arranged to carry fluid flow in series. In some implementations, the first turboexpander generator and the second turboexpander generator are plumbed into a first conduit flow passage and a second conduit flow passage, respectively, that are arranged to carry fluid flow in parallel to one another.

In some implementations, the first fluid flow and the second fluid flow comprise hydrocarbon gas. In some implementations, the first fluid flow and the second fluid flow include hydrogen gas. In some implementations, the first fluid flow and the second fluid flow include carbon dioxide gas. In some implementations, the first fluid flow and the second fluid flow include air. Any high-pressure gas that has a pressure stepdown requirement, for example, gas from a pipeline entering a processing facility, can be depressurized or cooled by the turboexpander generators and arrangements described throughout this disclosure.

Electrical power is generated by at least one of the turboexpander generators. For example, in some implementations, electrical power is generated by the first electrical generator. In some implementations, electrical power is generated by the second turboexpander generator. In some instances generating electrical power by either turboexpander generator includes adjusting flow rate through a turboexpander generator 102, for example, by a flow control valve 208, based on specified downstream conditions. In some instances, generating electrical power includes adjusting an electrical load of a turboexpander generator, for example, by the turboexpander generator controller 118, based on the specified downstream conditions. In some instances, generating electrical power by either turboexpander generator can be ceased responsive to a change in specified downstream conditions. For example, power generation is ceased when a feed-rate of fluid drops below a specified threshold. When electrical power is being produced, in some implementations, the produced electrical power is directed towards an electrical user separate from the downstream user 204 of the first fluid flow and the second fluid flow.

While some example implementations have been described with turboexpander generators 102 in parallel or series arrangements with other turboexpander generators 102 or Joule-Thomson valves 206, other arrangements are possible without departing from this disclosure, for example, an additional turboexpander generator can be added in parallel with turboexpander generators already arranged in series. Alternatively or in addition, additional turboexpander generators 102 can be added in series to a turboexpander 102 that is already arranged in parallel with another expander. In some implementations, additional pressure regulators, such as Joule-Thomson valves 206 (or other regulators) can be added in parallel or series with any turboexpander generator.

A number of implementations have been described. Nevertheless, it will be understood that various modifications may be made without departing from the spirit and scope of this disclosure. Accordingly, other implementations are within the scope of the following claims.

What is claimed is:

1. A system comprising:
a first turboexpander generator comprising a first turbine wheel configured to decrease a temperature or pressure of a process stream flowing through the first turboexpander generator by generating rotational movement from the process stream; and
a second turboexpander generator comprising a second turbine wheel configured to decrease a temperature or pressure of a process stream flowing through the second turboexpander generator by generating rotational movement from the process stream, the second turboexpander generator being downstream of and receiving a flow output of the first turboexpander generator, wherein the first turboexpander generator and the second turboexpander generator each comprise:
an electric rotor coupled to the respective turbine wheel to rotate with the turbine wheel;
an electric stator surrounding the rotor, wherein an annulus defined by the electric rotor and the electric stator is configured to receive a process fluid flow;
magnetic bearings carrying the rotor within the stator, a portion of the magnetic bearings being supported by the stator; and
a housing enclosing the rotor and stator, the housing being hermetically sealed between an inlet and an outlet of each turboexpander generator,
the outlet of the first turboexpander generator being fluidically coupled to the inlet of the second turboexpander generator so that all flow exiting the outlet of the first turboexpander generator is directed into the inlet of the second turboexpander generator.

2. The system of claim 1, wherein the first and the second turboexpander generator being substantially identical in critical dimensions and performance.

3. The system of claim 1, further comprising a controller configured to regulate the first turboexpander generator and the second turboexpander generator.

4. The system of claim 3, wherein the inlet and the outlet of each turboexpander are centered on a same longitudinal axis of each turboexpander generator.

5. The system of claim 3, wherein the stator comprises variable stator vanes configured to throttle fluid flow through the first turboexpander generator or the second turboexpander generator.

6. The system of claim 1, further comprising:
a flow control valve upstream of the first turboexpander generator, the flow control valve configured to regulate a flow-rate through the first turboexpander generator and the second turboexpander generator.

7. The system of claim 1, further comprising:
a Joule-Thomson valve defining a portion of a third conduit flow passage arranged to carry fluid flow in series with the first turboexpander generator and the second turboexpander generator.

8. A method comprising:
receiving a fluid flow by a first turboexpander generator defining a first portion of a conduit flow passage, wherein the fluid flow flows through an annulus defined by an electric rotor and an electric stator of the first turboexpander generator; and
receiving all of the fluid flow by a second turboexpander generator from an outlet of the first turboexpander generator, the second turboexpander generator defining a second portion of the conduit flow passage.

9. The method of claim 8, wherein the fluid flow comprises hydrocarbon gas.

10. The method of claim 8, wherein the fluid flow comprises hydrogen gas.

11. The method of claim 8, wherein the fluid flow comprises air.

12. The method of claim 8, wherein the first turboexpander generator and the second turboexpander generator being substantially identical in performance and critical dimensions.

13. The method of claim 8, further comprising generating electrical power by the first turboexpander generator.

14. The method of claim 8, further comprising ceasing generating electrical power by the first turboexpander generator responsive to a change in specified downstream conditions.

15. The method of claim 8, wherein generating electrical power by the first turboexpander generator comprises:
adjusting flow rate, by a flow control valve, based on specified downstream conditions.

16. The method of claim 8, further comprising:
directing electrical power produced by the first turboexpander generator or the second turboexpander generator towards an electrical user separate from a user of the fluid flow.

17. A system comprising:
a conduit comprising:
a first turboexpander generator comprising a first turbine wheel configured to decrease a temperature or pressure of a process stream flowing through the first turboexpander generator by generating rotational movement from the process stream;
a second turboexpander generator comprising a second turbine wheel configured to decrease a temperature or pressure of the process stream flowing through the second turboexpander generator by generating rotational movement from the process stream, the second turboexpander generator being downstream of and receiving an entire flow output from the first turboexpander generator, wherein the first turboexpander generator and the second turboexpander generator each comprise:
an electric rotor coupled to the respective turbine wheel to rotate with the turbine wheel;
an electric stator surrounding the rotor, wherein an annulus defined by the electric rotor and the electric stator is configured to receive a process fluid flow;
magnetic bearings carrying the rotor within the stator, a portion of the magnetic bearings being supported by the stator; and
a housing enclosing the rotor and stator, the housing being hermetically sealed between an inlet and an outlet of each turboexpander generator; and
a Joule-Thomson valve being positioned downstream or upstream of the first turboexpander generator or the second turboexpander generator, the Joule-Thomson valve configured to receive the same flow of the process stream as the first turboexpander generator and the second turboexpander generator; and
a controller configured to regulate the first turboexpander generator and the second turboexpander generator.

18. The system of claim 17, wherein the stator comprises variable stator vanes configured to throttle fluid flow through the first turboexpander generator or the second turboexpander generator.

19. The system of claim 17, wherein the first and the second turboexpander generator being substantially identical in critical dimensions and performance.

20. The system of claim 19, further comprising:
a flow control valve upstream of the first turboexpander generator, the flow control valve configured to regulate a flow-rate through the first turboexpander generator, the second turboexpander generator, and the Joule-Thomson valve.

21. The system of claim 19, further comprising a third turboexpander generator.

22. The system of claim 21, wherein the third turboexpander generator is arranged to carry a same fluid flow as the first turboexpander generator, second turboexpander generator, and the Joule-Thomson valve.

23. The system of claim 21, wherein the conduit is a first conduit, the third turboexpander generator being within a second conduit fluidically parallel to the first conduit.

24. The system of claim 19, wherein the controller is further configured to:
receive a data stream indicative of a process condition downstream of the first turboexpander generator and the second turboexpander generator; and
adjust a flow rate, by a flow control valve, based on one or more specified downstream conditions.

25. The system of claim 19, wherein the controller is further configured to:
condition electrical power produced by the first turboexpander generator and the second turboexpander generator; and
direct power into an electrical grid, the power being in-phase with the electrical grid.

* * * * *